Sept. 11, 1934.　　P. SHANNON ET AL　　1,973,665
PHOTOGRAPH AND PROCESS OF TAKING IT
Original Filed Feb. 11, 1932　　2 Sheets-Sheet 1

INVENTORS
Palmer Shannon &
John Wilson Royer
BY
Augustus B. Straughton
ATTORNEY.

WITNESS:

Sept. 11, 1934.  P. SHANNON ET AL  1,973,665
PHOTOGRAPH AND PROCESS OF TAKING IT
Original Filed Feb. 11, 1932  2 Sheets-Sheet 2

WITNESS:
Rob't R. Kitchel.

INVENTORS
Palmer Shannon
John Wilson Royer
BY
Augustus B. Stoughton
ATTORNEY.

Patented Sept. 11, 1934

1,973,665

UNITED STATES PATENT OFFICE 1,973,665

PHOTOGRAPH AND PROCESS OF TAKING IT

Palmer Shannon and John Wilson Royer, New York, N. Y., assignors to Royer, Inc., New York, N. Y., a corporation of New York Application February 11, 1932, Serial No. 592,226
Renewed January 23, 1934

5 Claims. (Cl. 95—5)

Our invention relates to photographs which show a near-by object, such as a part of the body, exactly as it appears to an observer, who is the subject of the photograph.

A further feature of our invention is a process for taking such photographs which consists in placing a mirror adjacent the eye of the observer and photographing the reflection of the object as it appears in the mirror.

More specifically our process consists in interposing a mirror between the eye of an observer and the object to be photographed, focusing a camera upon the mirror so that the axis of focus of the camera strikes the mirror at a point which intersects the line of vision from the eye of the observer to the object and strikes the mirror at an angle of incidence equal to that at which the line of vision strikes the mirror, photographing the reflection thus focused in the camera from the mirror, and transposing the picture so obtained left for right in the finished print so that the finished print shows the object exactly as it appears to the eye of the observer.

For a further exposition of my invention reference may be had to the annexed drawings and specification at the end whereof my invention will be specifically pointed out and claimed.

Figure 2:
Figure 2 shows a finished photograph.

In the drawings we have indicated one form which our invention may take, namely, the making of photographs of the hands of a golfer exactly as they appear to the eye of the player himself. Our invention is not to be limited to this particular example but extends broadly to the making of photographs of any near-by objects, whether parts of the body of the observer or not, exactly as they appear to the observer.

Figure 1:
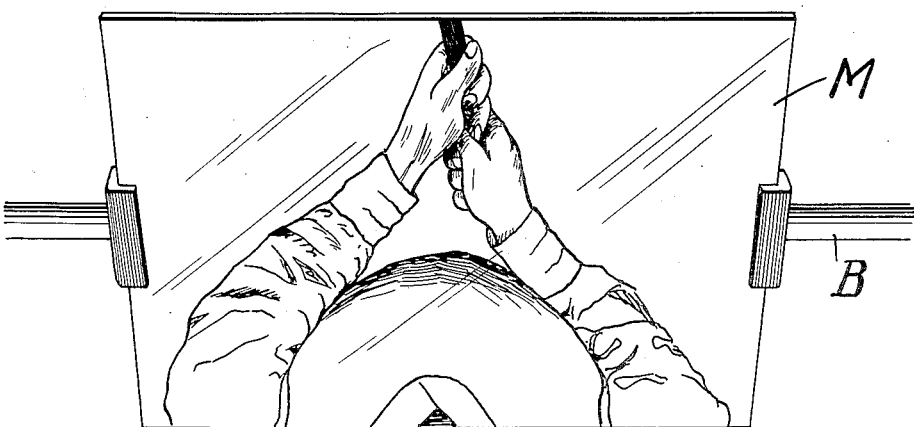
Figure 1 is a front elevation of the observer, the object and the mirror.
Figure 1:
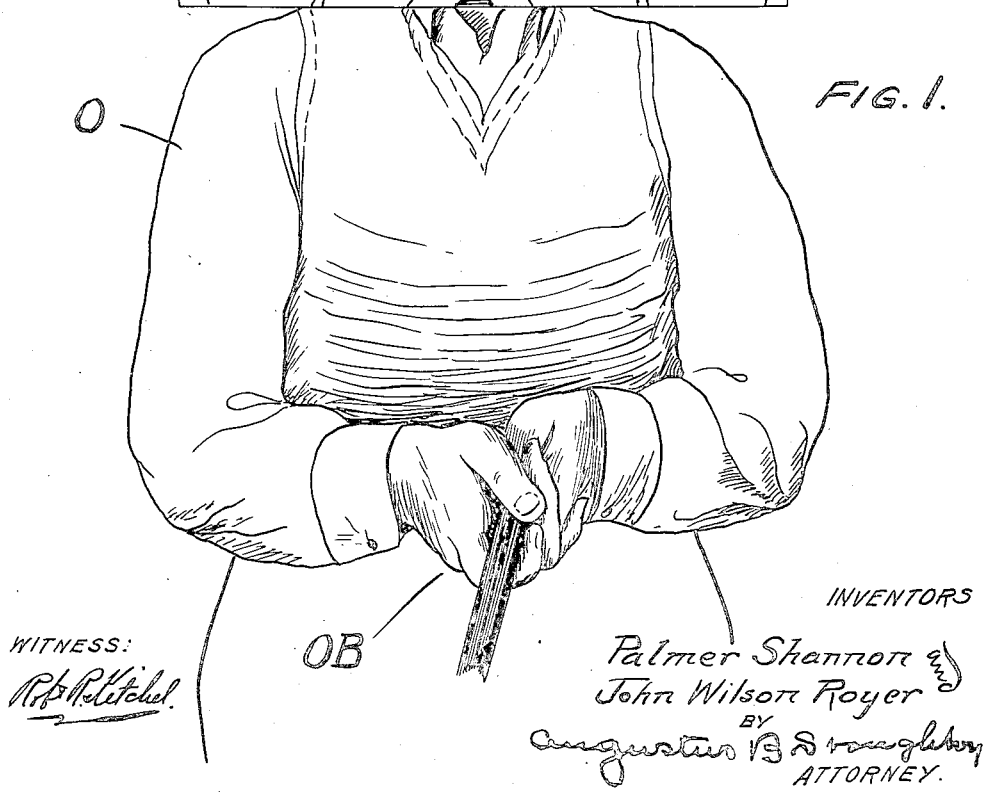
Figure 3:
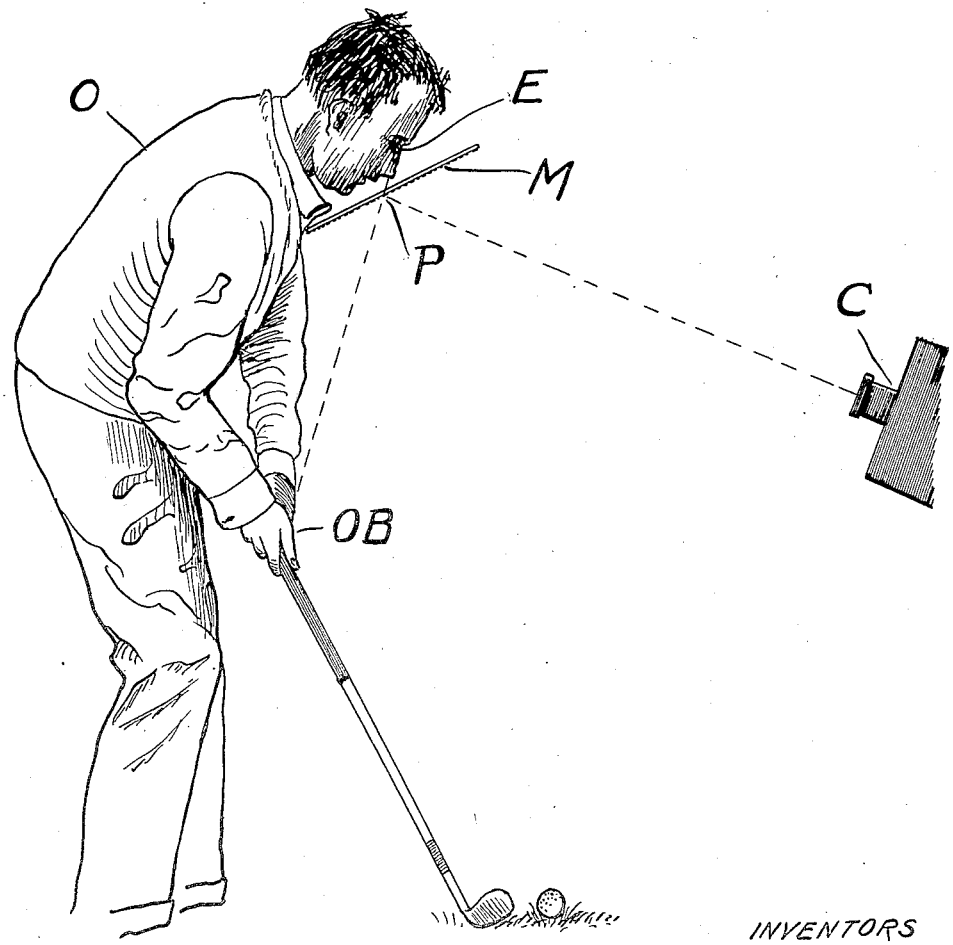
Figure 3 is a side elevation of the observer, the object, the mirror and the camera.

In Figure 1 of the drawings there is shown an observer O and also the object OB which in this instance is his hands but which may be any nearby object. Figure 1 also shows a mirror M supported by a bracket B or other support closely adjacent the eye of the observer. As will be seen from Figure 3, there is a line of vision from the eye E of the observer to the object OB. In Figure 3 this line of vision is interrupted by the mirror M. This interruption is not necessary, although it is preferable, as the mirror may be placed in any position adjacent the eye of the observer as above or to one side of his head. In Figure 3 there is also shown a camera C which has an axis of focus shown as the line CP. This line strikes the mirror M at a point to intersect the line of vision E OB. The angle of incidence of the line E OB and mirror M is preferably but, not necessarily, equal to the angle of incidence of the line CP with the mirror M. The camera C is located a suitable distance from mirror M to secure an undistorted image.

It is necessary that the picture taken by the camera C be transposed left for right in the finished print in order that the finished print show the object exactly as it appears to the eye of the observer. This transposition may be performed in two ways. The film or plate of the camera C may be inserted with the opposite side to that customarily used exposed to the lens. The film or plate is then developed in the customary manner. We may also secure this result in another way. The film or plate of the camera is exposed and developed in the usual manner and the negative or plate is reversed in printing so that the finished print is transposed from the picture taken by the camera.

Figure 2 shows the finished picture F which, when viewed from the top of the sheet, shows the object OB exactly as it appears to the eye of the observer with the parts in natural proportion.

It will, of course, be obvious that the photographs of my invention may be either single pictures, known in the art as "stills", or may be series of pictures adapted to be projected through suitable projectors to form "moving pictures". In the event that the photographs are adapted for use as moving pictures they may also have sound recorded thereon by any of the processes now known or may have sound synchronized therewith on separate articles, such as phonograph disks by processes now known. It is an object of my invention that the photographs and sound so recorded shall be such as to give the effect of a personality or living character to the camera or projector. In other words, the photograph will represent objects exactly as they apper to the eye of an observer and the sound will represent sounds either of his own voice or of persons addressing him or other sounds exactly as they are heard by the ear of the observer. In this way I obtain a new psychological effect heretofore unobtainable. This effect consists in conveying the impression to the observer and/or auditor of the photograph or film of actions performed or sounds heard by himself instead of the representation of the sounds heard or actions performed by another person. This method has dramatic possibilities heretofore unknown and original with ourselves.

The mirror M which forms a part of our apparatus may be any suitable reflecting surface but preferably is a mirror having its front surface silvered or rendered reflecting. A polished metallic surface may be used as a mirror instead of a glass mirror if desired.

We do not intend to be limited in the practice of our invention save as the scope of the prior art and of the attached claims may require.

We claim:

1. A process of photographing near-by objects exactly as they appear to the eye of a subject of the photograph which consists in placing a mirror adjacent the eye of the subject, and photographing the reflection of an object in the mirror.

2. The process of producing a photograph displaying objects exactly as they appear to the eye of a subject of the photograph which consists in placing a mirror adjacent the eye of the subject, photographing the reflection of an object in the mirror, and transposing left for right the reflection photographed in the mirror.

3. A process of photographing a near-by object exactly as it appears to the eye of a subject of the photograph which consists in intersecting the line of vision from the eye of the subject to an object by means of a mirror close to the eye, and photographing the reflection of the object in the mirror by placing a camera so that its axis of focus intersects the line of vision at the surface of the mirror.

4. The process of photographing a near-by object exactly as it appears to the eye of a subject of the photograph which consists in intersecting a line of vision from the eye of the subject to an object by means of a mirror close to the eye, photographing the reflection of the object in the mirror by means of a camera so located that its axis of focus intersects said line of vision at the surface of said mirror, the angles of incidence of said line of vision and said axis of focus with said mirror being equal, and transposing left for right the picture photographed by said camera.

5. The process of photographing a near-by object or part of the body of the subject of the photograph exactly as it appears to the eye of the subject, which process consists in locating a mirror near the eye of the subject, deflecting light from a near-by object or part of the body of the subject of the photograph, which light would otherwise reach the eye of the subject of the photograph, and activating a sensitized plate in a camera by means of said deflected light.

PALMER SHANNON.
JOHN WILSON ROYER.